United States Patent
Edwards

(10) Patent No.: US 8,482,171 B2
(45) Date of Patent: Jul. 9, 2013

(54) MAGNETIC GEAR ARRANGEMENT

(75) Inventor: Huw L. Edwards, Derby (GB)

(73) Assignee: Rolls-Royce PLC, London (GB)

( * ) Notice: Subject to any disclaimer, the term of this patent is extended or adjusted under 35 U.S.C. 154(b) by 212 days.

(21) Appl. No.: 13/133,324

(22) PCT Filed: Nov. 9, 2009

(86) PCT No.: PCT/EP2009/007980
§ 371 (c)(1),
(2), (4) Date: Jun. 7, 2011

(87) PCT Pub. No.: WO2010/075907
PCT Pub. Date: Jul. 8, 2010

(65) Prior Publication Data
US 2011/0234034 A1    Sep. 29, 2011

(30) Foreign Application Priority Data
Jan. 5, 2009  (GB) .................................. 0900022.5

(51) Int. Cl.
*H02K 11/00* (2006.01)
*H02K 7/10* (2006.01)
*H02K 49/00* (2006.01)

(52) U.S. Cl.
USPC ........... 310/68 C; 310/103; 310/114; 310/266

(58) Field of Classification Search
USPC .................. 310/103, 105, 106, 112–114, 266, 310/68 C; 417/420, 423.7
See application file for complete search history.

(56) References Cited

U.S. PATENT DOCUMENTS

| 5,311,615 A * | 5/1994 | Couetoux ..................... 388/836 |
| 5,633,555 A * | 5/1997 | Ackermann et al. ......... 310/75 D |
| 6,217,298 B1 * | 4/2001 | Klaui ............................ 417/420 |

(Continued)

FOREIGN PATENT DOCUMENTS

| DE | 27 06 985 A1 | 8/1978 |
| DE | 44 05 701 A1 | 8/1995 |
| GB | 2 447 592 A | 9/2008 |
| JP | A-58-186382 | 10/1983 |
| WO | WO 2007/107691 A1 | 9/2007 |

OTHER PUBLICATIONS

Chau et al., "Transient analysis of coaxial magnetic gears using finite element comodeling," *Journal of Applied Physics*, 2008, vol. 103, pp. 07F101-1-07F101-3.

(Continued)

*Primary Examiner* — Tran Nguyen
(74) *Attorney, Agent, or Firm* — Oliff & Berridge, PLC

(57) ABSTRACT

A magnetic gear arrangement comprises: (i) a first gear member for generating a first magnetic field, (ii) a second gear member for generating a second magnetic field, and (iii) a coupling device which provides arrangements of interpoles between the first gear member and the second gear member. The interpoles couple the first and second magnetic fields such that different arrangements of interpoles produce different gear ratios between the first and second gear members. The coupling device comprises a plurality of ferromagnetic pole elements which at leastly partly form the interpoles. Each pole element has a Curie temperature whereby the pole element is active below its Curie temperature and inactive above its Curie temperature. The magnetic gear arrangement further comprises a temperature controller for controlling the temperature of at least some of the pole elements such that, under the control of the temperature controller, the temperatures of pole elements can cross their respective Curie temperatures and thereby change from active to inactive or the reverse.

15 Claims, 3 Drawing Sheets

U.S. PATENT DOCUMENTS

| | | | | |
|---|---|---|---|---|
| 6,710,492 B2 * | 3/2004 | Minagawa | ............... | 310/113 |
| 6,774,591 B2 * | 8/2004 | Arimitsu et al. | ............... | 318/154 |
| 6,794,781 B2 * | 9/2004 | Razzell et al. | ............... | 310/114 |
| 6,903,471 B2 * | 6/2005 | Arimitsu et al. | ............... | 310/59 |
| 7,250,702 B2 * | 7/2007 | Abou Akar et al. | ............... | 310/114 |
| 7,549,467 B2 * | 6/2009 | McDonald et al. | ............... | 166/66.4 |
| 7,791,235 B2 * | 9/2010 | Kern et al. | ............... | 310/103 |
| 8,063,526 B2 * | 11/2011 | Bright | ............... | 310/103 |
| 8,358,044 B2 * | 1/2013 | Waszak et al. | ............... | 310/103 |
| 2007/0107685 A1 * | 5/2007 | Farah | ............... | 123/90.31 |

OTHER PUBLICATIONS

British Search Report in British Patent Application No. 0900022.5; Apr. 3, 2009.

International Search Report in International Application No. PCT/EP2009/007980; dated Oct. 18, 2010.

Written Opinion of the International Searching Authority in International Application No. PCT/EP2009/007980; dated Oct. 18, 2010.

* cited by examiner

MAGNETIC GEAR ARRANGEMENT

The present invention relates to magnetic gear arrangements, particularly magnetic gear arrangements having a variable gear ratio.

Gearboxes and gear arrangements are utilised in a wide range of situations in order to couple drive mechanisms. Traditionally, gearboxes have been formed from gear wheels having appropriate teeth numbers and sizes to provide a desired gear ratio. However, such gearboxes have a number of disadvantages. Firstly, they require the use of lubricating oils, which may act as contaminants or fire hazards and may prove ineffective in hot or cold environments, where the oil viscosity varies, or in a low pressure environment, where the oil may evaporate. Furthermore, gearboxes based on gear wheels may be noisy, making them unacceptable for low noise environments such as in hospitals, libraries and residential areas, or for clandestine military activities.

More recently, magnetic gearboxes have been provided which comprise respective gear rotors with interpoles between them. The rotors incorporate permanent magnets, and the interpoles act to modulate the magnetic flux transferred between the gear rotors. Such magnetic gearboxes enable a speed-changing mechanical device to be provided in which there is no mechanical contact between input and output shafts, thus avoiding many of the problems of noise and wear that arise in gearboxes having contacting moving parts.

FIG. 1 shows a schematic plan view of a typical magnetic gear arrangement of the prior art. The magnetic gear arrangement 100 is an epicyclic gearbox and comprises an inner rotor 120 and an outer rotor 160. Permanent magnets 140,180 are fixed to the inner and outer rotors 120,160. The permanent magnets 140 affixed to the inner rotor 120 have alternating polarity along the circumference of the rotor. Similarly, the permanent magnets 180 affixed to the outer rotor 160 have alternating polarity along the circumference of that rotor. Typically, one rotor is mechanically coupled to a drive mechanism and the other rotor is mechanically coupled to a driven mechanism.

The inner and outer rotors 120,160 have different numbers of permanent magnets 140,180. Typically, the number of permanent magnets affixed to the outer rotor 160 is greater than that affixed to the inner rotor 120.

Pole elements 200 are provided between the inner rotor 120 and the outer rotor 160 and form an array to provide a coupling element having a cylindrical shape.

Each pole element 200 provides one interpole 200 for modulating the magnetic fields produced by the inner rotor 120 and the outer rotor 160, so as to couple the two fields and hence the motion of the rotors. The number of interpoles is a factor in determining the gear ratio of the magnetic gearbox.

The motion of the rotors 120,160 may be either co-rotational or counter-rotational, depending on the number of magnets affixed to each rotor and the number of interpoles.

It is desirable to provide gearboxes in which the number and/or spacing of interpoles is adjustable.

In general terms, the present invention provides a magnetic gear arrangement in which the number and/or torque carrying capacity of interpoles may be adjusted by varying the temperature of the elements that provide the interpoles.

In particular, a first aspect of the present invention provides a magnetic gear arrangement comprising:
a first gear member for generating a first magnetic field,
a second gear member for generating a second magnetic field, and
a coupling device which provides arrangements of interpoles between the first gear member and the second gear member, the interpoles coupling the first and second magnetic fields such that different arrangements of interpoles produce different gear ratios between the first and second gear members;

wherein:
the coupling device comprises a plurality of ferromagnetic pole elements which at leastly partly form the interpoles, each pole element having a Curie temperature whereby the pole element is active below its Curie temperature and inactive above its Curie temperature, and
the magnetic gear arrangement further comprises a temperature controller for controlling the temperature of at least some of the pole elements such that, under the control of the temperature controller, the temperatures of pole elements can cross their respective Curie temperatures and thereby change from active to inactive or the reverse.

Preferably, a different arrangement of interpoles is provided by the coupling device when the pole elements cross their respective Curie temperatures.

Above the Curie temperature, a ferromagnetic material becomes paramagnetic, rendering a pole element formed of such a material inactive. Thus simply by varying the temperature of pole elements, a gear change can be effected. By "a different arrangement of interpoles" we include also the possibility that when the temperatures of pole elements cross their respective Curie temperatures, no interpoles are formed by the pole elements, such that the to first and second gear members are decoupled. In this case the gear change is from coupling at a particular gear ratio to no coupling.

Typically, the maximum torque which the coupling element can transmit will differ for the gear ratios provided by the different arrangements of interpoles. This is because one of the arrangements will have fewer active pole elements to transmit torque.

Indeed, when the pole elements cross their respective Curie temperatures, the same arrangement of interpoles may be provided by the coupling device, but the number of pole elements forming those interpoles may be varied. In this way the strength of the interpoles can be varied, changing the maximum torque which the coupling element can transmit. Thus, different torque limits can be placed on the same interpole arrangement.

Preferably, a first portion of the pole elements has a first Curie temperature, and second portion of the pole elements has a higher second Curie temperature Providing a gear arrangement in which the coupling element comprises a plurality of magnetisable pole elements having different Curie temperatures can enable simpler temperature control strategies to provide different arrangements of interpoles.

For example, at temperatures below the first and second Curie temperatures, all the pole elements of both portions are in a ferromagnetic state. Therefore all the pole elements are active and able to contribute to the coupling of the first and second magnetic fields. Thus, the coupling element has a first, low-temperature interpole arrangement.

At temperatures between the temperatures of the first and second Curie temperatures, only the pole elements of the second portion are in a ferromagnetic state, i.e. those pole elements having a higher Curie temperature than the temperature of the coupling element. In contrast, the pole elements of the first portion are in a paramagnetic state, i.e. they are not able to contribute to the coupling of the first and second magnetic fields. Therefore, at temperatures between the first and second Curie temperatures, the coupling element comprises some active pole elements and some deactivated pole elements. Thus, the coupling element provides a second, intermediate-temperature interpole arrangement.

Moreover, the change from the first to the second interpole arrangement, and vice versa, can be effected simply by raising or lowering the temperature of the entire coupling element. That is, the temperature controller and coupling device may be configured such that the temperature controller varies the temperatures of all the pole elements of the coupling device, and all the pole elements can be maintained at substantially the same temperature.

The magnetic gear arrangement can be configured such that a change from a first, low-temperature interpole arrangement to a second, intermediate-temperature interpole arrangement results in a reversal of the direction of rotation of the second gear member relative to the first gear member. Thus, for example, the gear arrangement may function as a co-rotational gear arrangement at low temperatures (below the first and second Curie temperatures) and as a counter-rotational gear arrangement at intermediate temperatures (between the first and second Curie temperatures). Alternatively, the gear arrangement may provide a counter-rotational gear at low temperatures and a co-rotational gear at intermediate temperatures. However, in other embodiments both gear arrangements may be co-rotational, or both gear arrangements may be counter-rotational.

At temperatures above both the first and second Curie temperatures, all pole elements are in a paramagnetic state and are therefore deactivated. Therefore, no active pole elements are available to provide interpoles for coupling the first and second magnetic fields, and the coupling element can no longer transfer power between the first and second gear members.

The magnetic gear arrangement may be configured such that at temperatures below the first and second Curie temperatures, when all pole elements are active, each pole element forms a single interpole. In this case, the number of interpoles will decrease as the temperature is raised above the first Curie temperature and certain pole elements become deactivated. In this case, the gear arrangement will typically exhibit counter-rotating motion of the first and second gear members at low temperatures (i.e. below the first and second Curie temperatures) and co-rotating motion of the first and second gear members at intermediate temperatures (i.e. between the first and second Curie temperatures).

Alternatively, the magnetic gear arrangement may be configured such that at least one interpole in an arrangement of interpoles may be formed by a group of neighbouring active pole elements. That is, the coupling element may include a plurality of neighbouring pole elements that are sufficiently close together such that at temperatures below the first and second Curie temperatures, i.e. when all pole elements are active, the plurality of neighbouring pole elements provides a single interpole for the purposes of controlling the gear ratio between the first and second gear members.

Each pole element may be a lamella that is configured to allow it to be positioned in an array with neighbouring pole elements/lamellae such that the pole elements/lamellae are in abutting contact or at close separations. In this case, therefore, the number of interpoles may increase as the temperature is raised above the first Curie temperature, since certain pole elements in the plurality of neighbouring pole elements become inactive. The inactive pole elements act as spacers between neighbouring active pole elements, which therefore provide separate interpoles. In this case, the gear arrangement will typically exhibit co-rotating motion of the first and second gear members at low temperatures (i.e. below the first and second Curie temperatures) and counter-rotating motion of the first and second gear members at intermediate temperatures (i.e. between the first and second Curie temperatures).

The temperature controller may include heating and/or cooling elements for actively controlling the temperature of the whole or a portion of the coupling element. Typically, the temperature controller comprises a heating element, which may be a resistance heating element.

Power for the heating and/or cooling elements can be provided by an external power source (e.g. the electrical mains supply) or generated from the gearbox itself (e.g. using coils to draw out power).

The temperature controller can be adapted to keep the gearbox at a temperature near the Curie temperature of pole elements that are to be activated or inactivated. This assists the gearbox to change gear quickly.

The gear arrangement may further comprise a sensor for detecting the operating condition of the first and/or second gear member and communicating the operating condition to the temperature controller. For example, the sensor may detect the speed of the first and/or second gear members, and/or the torque transmitted by them. The data gathered by the sensor can then be used to activate the temperature controller when a predetermined operational condition of the gear arrangement is attained. Thus, the action of the temperature controller may itself be determined by the operating condition of the first and/or second gear member.

Alternatively, the temperature controller may be passive. That is, the controller can be simply a suitable configuration of the gearbox and/or a housing for gearbox, to ensure that the pole elements arrive at a desired temperature when the environment in which the gearbox is located is at a predetermined temperature. For example, in a gear arrangement located close to an engine, the temperature of the coupling element may vary according to the mode of operation of the engine.

The temperature controller and coupling device may be configured such that the temperature controller varies the temperatures of only a selected portion of the pole elements of the coupling device, and a temperature differential can be maintained between pole elements of the coupling device. With such a configuration, the same gear change strategies discussed above in relation to pole elements having two different Curie temperatures can be achieved simply by rendering selected pole elements active or inactive. All the pole elements of the coupling device can have the same Curie temperature.

For example, the temperature controller may comprise wiring which heats selected individual pole elements, heating current being generated in the wiring through the movement of the gear members relative to the wiring. The wiring may include the following one or more switches, for example mechanical switches, circuit breakers or power electronic devices capable of switching. Additionally or alternatively, the wiring may include one or more variable impedances. The switches and/or the variable impedances may be controlled by a control system described previously.

The non-selected pole elements may also be thermally insulated to shield them from the heating current. In contrast, if all the pole elements are heated by the wiring (i.e. all pole elements are selected), then all the pole elements can be rendered inactive to uncouple the first and second gear members. The power supplied to the wiring can vary with e.g. the speed of the gear members and/or the torque generated by the gear arrangement. Thus again, the action of the temperature controller may itself be determined by the operating condition of the first and/or second gear member.

The wiring may be electrically connected to one or more electronic filters, the filters selecting the heating current and suppressing current components which would otherwise be generated in the wiring through the movement of the gear members relative to the wiring. In this case, the or each filter is typically configured to select a harmonic component of the magnetic field for providing the heating current. Harmonic components of the magnetic field tend to inhibit efficient coupling of the first and second magnetic fields and so by removing these components, the filters may also serve to increase the efficiency of the gear arrangement.

Alternatively heat can be generated directly in the pole elements themselves, e.g. via eddy currents. For example, this can be achieved if the pole elements are made from an intrinsically lossy material (e.g. poorly or not laminated metal). The pole elements then heat up as the speed of the gear members increase, which in turn increases the magnitude of the eddy currents. Appropriate configuration of the pole elements can, therefore, provide another form of a passive temperature controller. However, it may be desirable to stabilise a change in the arrangement of interpoles induced by such eddy currents by applying e.g. some external heating at the time of the change. As the gear members speed up and the magnitude of the eddy currents increases, the external stabilising heating may not be needed.

The first and second gear members each generally have permanent magnets for generating the first and second magnetic fields respectively. Alternatively, the first and second magnetic fields may be generated by windings provided on the first and second gear members.

The first and second gear members typically have respective mechanical couplings. These couplings typically connect a drive mechanism and a driven mechanism.

The magnetic gear arrangement may be an inline gear arrangement or an epicyclic gear arrangement, or may have a different configuration.

Each pole element preferably has a laminated structure to reduce the formation of eddy currents.

The coupling element may comprise unbonded, mechanically-separate pole elements. Alternatively, neighbouring pole elements of the coupling element may be bonded via non-magnetisable portions of the coupling element. In this case, the bonded pole elements and the non-magnetisable portions may form e.g. an integral cylindrical coupling element. The non-magnetisable portions can provide the coupling element with mechanical strength. They may also serve to conduct heat between adjacent pole elements, such that the coupling element, and thus the gear arrangement, responds quickly to changes in external temperature. This may have the result that fewer external heating and/or cooling elements are required to produce a change in temperature of the coupling element. Typically, the non-magnetisable portions are electrically-conductive and may be laminated to limit the formation of eddy currents. The non-magnetisable portions may comprise a metal.

A second aspect of the present invention provides a method of operating a magnetic gear arrangement, the method comprising:

(a) providing a magnetic gear arrangement having:
a first gear member for generating a first magnetic field,
a second gear member for generating a second magnetic field, and
a coupling device which provides arrangements of interpoles between the first gear member and the second gear member, the interpoles coupling the first and second magnetic fields such that different arrangements of interpoles produce different gear ratios between the first and second gear members;

wherein:
the coupling device comprises a plurality of ferromagnetic pole elements which at least partly form the interpoles, each pole element having a Curie temperature whereby the pole element is active below its Curie temperature and inactive above its Curie temperature; and (b) controlling the temperature of at least some of the pole elements such that the temperatures of pole elements cross their respective Curie temperatures, and thereby change from active to inactive or the reverse.

Thus the method corresponds to the magnetic gear arrangement of the first aspect, and optional features of that magnetic gear arrangement may be applied also to the method.

For example, a different arrangement of interpoles can be provided by the coupling device when the pole elements cross their respective Curie temperatures. A portion of the pole elements may have a first Curie temperature, and another portion of the pole elements may have a higher second Curie temperature. The temperature may be controlled to vary the temperatures of all the pole elements of the coupling device, all the pole elements being maintained at substantially the same temperature. Alternatively, the temperature may be controlled to vary the temperatures of only a selected portion of the pole elements of the coupling device, a temperature differential being maintained between pole elements of the coupling device. The temperature may be controlled as a function of the operating condition of the first and/or second gear member, e.g. the operating condition of the first and/or second gear member may be detected and communicated to the temperature controller. The first gear member may have permanent magnets for generating the first magnetic field and the second gear member may have permanent magnets for generating the second magnetic field. Neighbouring pole elements may be joined together by non-magnetisable portions of the coupling device, e.g. the non-magnetisable portions may be formed of an electrically-conductive material.

Embodiments of the invention will now be described by way of example with reference to the accompanying drawings in which.

Figure 1:
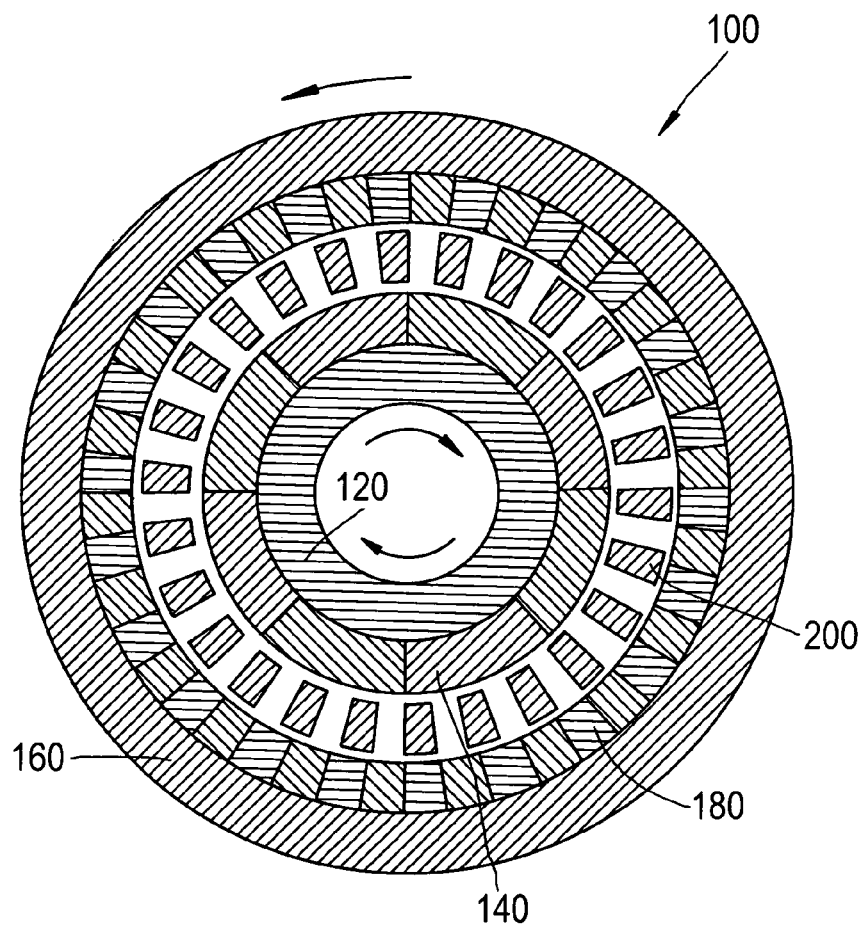
FIG. 1 shows a schematic plan view of a gearbox of the prior art.
Figure 2:
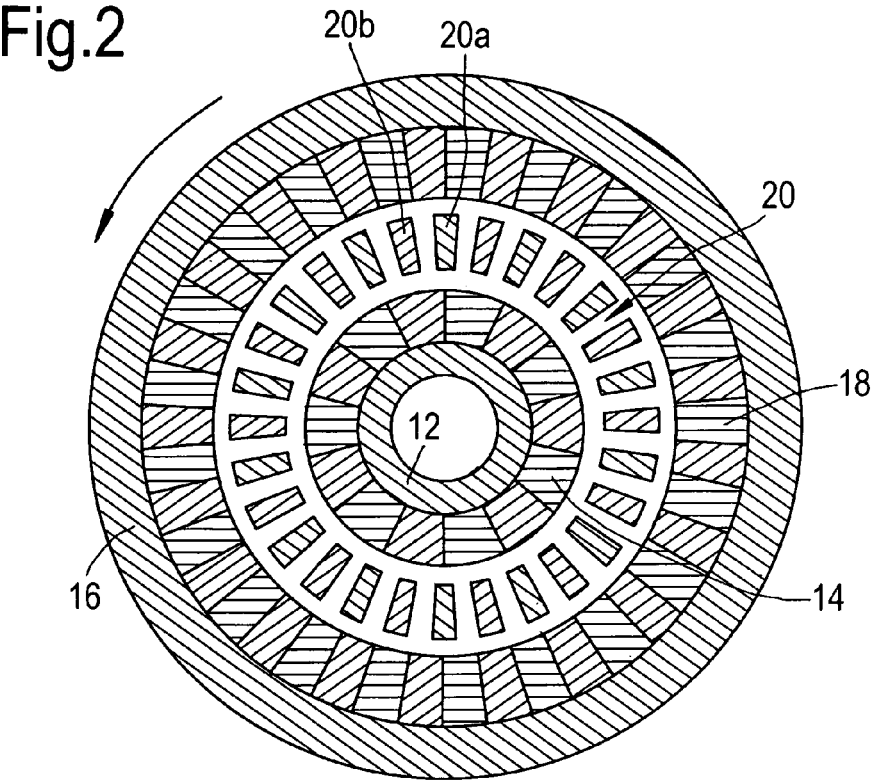
FIG. 2 shows a schematic plan view of a gearbox according to an embodiment of the first aspect of the present invention.

FIG. 2 shows a schematic plan view of a magnetic gear arrangement according to an embodiment of the first aspect of the present invention. The magnetic gearbox 10 is an epicyclic gearbox and comprises an inner rotor 12 (i.e. a first gear member) and an outer rotor 16 (i.e. a second gear member). Permanent magnets 14,18 are fixed to the inner and outer rotors 12,16. The permanent magnets 14 affixed to the inner rotor 12 have alternating polarity along the circumference of the rotor. Similarly, the permanent magnets 18 affixed to the outer rotor 16 have alternating polarity along the circumference of that rotor. Typically, one rotor is mechanically coupled to a drive mechanism and the other rotor is mechanically coupled to a driven mechanism.

The inner and outer rotors 12,16 have different numbers of permanent magnets 14,18. Typically, the number of permanent magnets affixed to the outer rotor 16 is greater than that affixed to the inner rotor 12.

Pole elements 20a, 20b are provided between the inner rotor 12 and the outer rotor 16, and form an array having a cylindrical shape. Active pole elements (i.e. pole elements whose temperature lies below their Curie temperature) form interpoles that modulate the magnetic fields produced by the inner rotor 12 and the outer rotor 16, so as to couple the two fields and hence couple the motion of the rotors. The number of interpoles is a factor in controlling the gear ratio of the magnetic gearbox.

Effectively, the pole elements are part of a coupling element 20 that provides arrangements of interpoles for coupling the magnetic fields produced by the inner and outer rotors 12,16. In the embodiment of FIG. 2, each active pole element forms a single interpole of the coupling element.

The motion of the rotors 12,16 may be either co-rotational or counter-rotational, depending on the number of magnets affixed to each rotor and the number of interpoles.

The coupling element 20 comprises a first set of pole elements 20a and a second set of pole elements 20b. The two sets of pole elements are each made of magnetisable material, the magnetisable material of the first set of pole elements 20a having a different Curie temperature to the magnetisable material of the second set of pole elements 20b. Thus, the magnetisable material of the first set of pole elements 20a changes its behaviour from ferromagnetic to paramagnetic at a different temperature to the magnetisable material of the second set of pole elements 20b. Magnetisable materials are able to modulate a magnetic field much more strongly below their Curie temperature, i.e. when they are in a ferromagnetic state, than above their Curie temperature, i.e. when then are in a paramagnetic state. A magnetisable material in its paramagnetic state is effectively unable to contribute to modulation of a magnetic field, and is inactive.

When the magnetic gearbox 10 is operated at temperatures below the Curie temperature of both sets of pole elements 20a and 20b, each set of pole elements 20a,20b is active and forms interpoles for the modulation of the magnetic fields produced by the inner and outer rotors 12, 16. Thus, the gear ratio of the magnetic gearbox is determined by the total number of pole elements disposed between the inner and outer rotors 12,16.

When the magnetic gearbox 10 is operated at temperatures greater than the Curie temperature of one set of pole elements, but lower than the Curie temperature of the other set of pole elements, only one set of pole elements forms interpoles for the modulation of the magnetic fields produced by the inner and outer rotors 12,16. In this case, therefore, the number of active pole elements is halved, and so is the number of interpoles. Thus, the magnetic gearbox 10 operates according to a different gear ratio than in the case where all pole elements 20a,20b are active.

When the magnetic gearbox 10 is operated at temperatures greater than the Curie temperature of either set of pole elements 20a,20b, all the pole elements are deactivated. That is, no interpoles are formed for modulating the magnetic fields produced by the inner and outer rotors 12,16. The gearbox 10 is therefore no longer able to couple the motion of the inner and outer rotors 12,16. Thus, the gearbox 10 has a built-in safety mechanism that prevents its operation at excessively high temperatures.

Such decoupling of the rotors can also be deliberately controlled, providing a clutch-like effect. Complete decoupling can be achieved by heating all the pole elements being heated above their Curie temperatures. Alternatively, only selected pole elements can be rendered inactive. This can allow the maximum torque transmissible by the coupling element to be altered. In other words, the torque limit of the coupling element can be changed without necessarily changing the gear ratio.

Preferably, the magnetisable material of the first and second sets of pole elements 20a, 20b is a metallic material. Metals are generally good conductors of heat and therefore pole elements comprising a metallic material will tend to react quickly to changes in temperature, thus allowing rapid changes in the gear ratio or mode of operation of the gearbox to be achieved.

Typically, the magnetisable material of the first set of pole elements 20a is electrical steel. The magnetisable material of the second set of pole elements will usually be different from the first set of pole elements and may be e.g. ferrite, metal alloys, cobalt or nickel. Typically, the pole elements are laminated to reduce the formation of eddy currents.

A magnetic gear arrangement like that shown in FIG. 2 may operate in a counter-rotational mode at low temperatures (i.e. at temperatures below the Curie temperature of each set of pole elements 20a,20b) and in a co-rotational mode at intermediate temperatures (i.e. at temperatures between the Curie temperatures of the two set of pole elements 20a,20b).

A temperature controller (not shown) controls the temperature of the pole elements. The controller may simply be a heater or cooler for the entire magnetic gear arrangement. Other possible forms of the controller are discussed below in respect of further embodiments of the invention.

Figure 3:
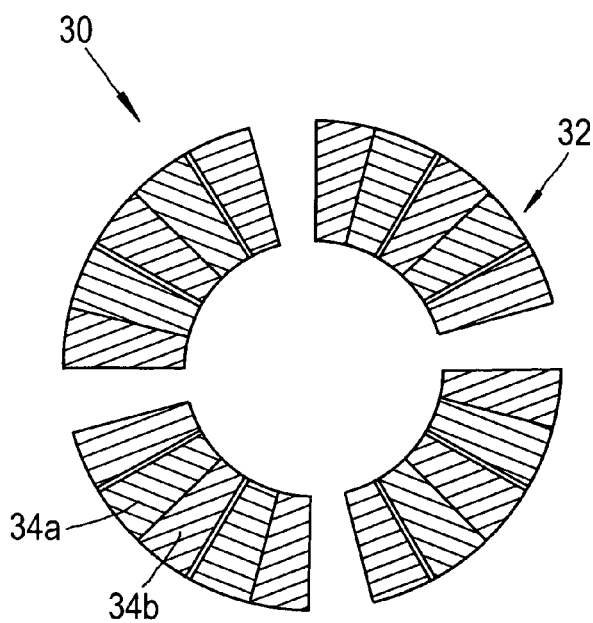
FIG. 3 shows a schematic plan view of a coupling element for a gear arrangement according to another embodiment of the first aspect of the present invention.

FIG. 3 shows a schematic plan view of a coupling element for a gear arrangement according to another embodiment of the invention. The coupling element is suitable for a rotor pole pair combination of four pole pairs on one rotor and eight pole pairs on the other rotor, and, as described below, can provide four circumferentially spaced interpoles for a co-rotating gear and twelve circumferentially spaced interpoles for a counter rotating gear). The coupling element 30 is typically disposed between the inner and outer rotors of an epicyclic magnetic gearbox. Alternatively, the coupling element may form part of an in-line magnetic gearbox. The coupling element 30 provides arrangements of interpoles between the inner and outer rotors, for coupling the magnetic fields generated by the two rotors.

The coupling element 30 comprises two sets of pole elements 34a,34b. The pole elements each comprise a magnetisable material, the magnetisable material of the first set of pole elements 34a having a different Curie temperature than the magnetisable material of the second set of pole elements 34b.

Neighbouring pole elements are sufficiently closely spaced that groups 32 of neighbouring pole elements may form a single interpole for the purposes of controlling the gear ratio of the gearbox, provided that all of the pole elements in the group 32 are at a temperature lower than their respective Curie temperature. That is, each pole element effectively represents one lamella in an array of is closely-spaced lamellae. Thus, at temperatures lower than Curie temperatures of the first and second sets of pole elements 34a,34b, the coupling element of FIG. 3 forms four discrete interpoles.

At temperatures greater than the Curie temperature of one set of pole elements (e.g. the first set of pole elements 34a), but lower than the Curie temperature of the other set of pole elements (e.g. the second set of pole elements 34b), only one set of pole elements is able to actively modulate the magnetic field generated by the inner and outer rotors of the gearbox (that is, in this example, the second set of pole elements 34b). The remaining set of pole elements (in this example, the first set of pole elements 34a) is deactivated and cannot contribute to the coupling of the magnetic fields of the inner and outer rotors.

Under these conditions, the coupling element 30 provides twelve discrete interpoles, each active pole element forming one interpole. Thus, the gearbox operates at a different gear ratio than in the case where all the pole elements 34a,34b of the coupling element 30 are active.

At temperatures greater than the Curie temperatures of both the first and second set of pole elements 34a,34b, all the pole elements are deactivated, i.e. the two sets of pole elements 34a,34b form no interpoles for coupling the magnetic fields generated by the inner and outer rotors of the gearbox, and thus no mechanical force is transmitted between the rotors via the pole elements 34a,34b.

Preferably, the circumferential separation of the groups 32 of neighbouring pole elements is equivalent to the arc defined by one pole element. In this case, if the first set of pole elements 34a are deactivated while the second set of pole elements 34b remain active, the active pole elements 34b, each forming a single interpole, will be evenly circumferentially-spaced around the coupling element. It has been found that evenly-spaced interpoles promote efficient coupling of the motion of the first and second rotors.

Since the coupling element 30 of FIG. 3 has groups 32 of neighbouring pole elements, which each form a single interpole at temperatures below the Curie temperature of both the first and second set of pole elements 34a,34b, the number of interpoles provided by the coupling element 30 increases when the temperature is raised above the Curie temperature of one of the sets of pole is elements. By contrast, in the gearbox shown in FIG. 2, the number of interpoles decreases when the temperature is raised in this way.

Typically, the magnetic gear arrangement shown in FIG. 3 operates in a co-rotational mode at low temperatures (i.e. at temperatures below the Curie temperature of each set of pole elements 34a,34b) and in a counter-rotational mode at intermediate temperatures (i.e. at temperatures between the Curie temperatures of the two set of pole elements 34a,34b).

Different interpole arrangements are needed for different rotor pole pair combinations. In general, it is desirable for the low temperature arrangement to be the co-rotational gear. This is because a co-rotational gear requires fewer interpoles. Therefore, the interpoles can be wider (i.e. extend further circumferentially in the case of a coupling element for two rotors) and there are fewer gaps between interpoles. The interpole arrangement for the higher temperature counter-rotational gear has more interpoles and consequently more gaps between interpoles, but it is usually easier to accommodate additional gaps than it is to close existing gaps (which is what would be required if the lower temperature arrangement were counter-rotational and the higher temperature arrangement co-rotational). In some cases (i.e. as in FIGS. 2 and 3) the additional gaps can be symmetrically distributed. In other cases, however, such symmetry may not be achievable, and it may be necessary to operate with one more incomplete interpoles, or even have an interpole missing, in one or both of the arrangements. Nonetheless, as long as the majority of the interpoles are in the correct angular position for both arrangements of interpoles, the gear should function correctly.

The gearboxes of the present invention, e.g. the gearbox of FIG. 2 or gearboxes having the coupling element of FIG. 3 may be operated according to one of three modes of operation:

(i) low temperature operation, in which all pole elements are active;
(ii) intermediate temperature operation in which one set of pole elements is active and another set is deactivated;
(iii) high temperature operation, in which no pole elements are active and no force is transferred between the inner and outer rotors via the pole elements. This mode of operation may provide a safety feature for the gearbox to prevent operation at excessively high temperatures.

In general, the torque carrying capability of the gearbox depends on the interpole area on a complete turn around the coupling element. As interpole area is lost when pole elements become inactive, it is typically desirable to have the gear requiring the higher torque carrying capability as the low temperature gear.

The mode of operation of the gearbox may be changed by means of a temperature controller provided by the gearbox and comprising e.g. heating and/or cooling elements.

Alternatively, the mode of operation of the gearbox may change as a result of temperature changes in the environment in which it is located, e.g. the temperature of a gearbox located within or adjacent to an engine will change during operation of the engine. In this case, the temperature controller can be passive. That is, the controller can be simply a suitable configuration of the gearbox (i.e. the thermal properties of its components, such as thermal conductivity, heat capacity and heat transfer coefficient) and/or a housing for gearbox, to ensure that the pole elements arrive at a desired temperature when the environment is at a predetermined temperature.

If the gearbox is provided with an active temperature controller, this may be powered using external power. Alternatively, the temperature controller may be powered using power taken from the gearbox. For example, wiring may be wound around individual pole elements or groups of pole elements and the electrical current induced in the wiring by the changing magnetic fields may be used to power the temperature controller. In this case, the wiring may be connected to one or more electronic filters which draw out components of the current having a predetermined frequency or range of frequencies, e.g. harmonic components of the current, for use in powering the temperature controller.

Figure 4:
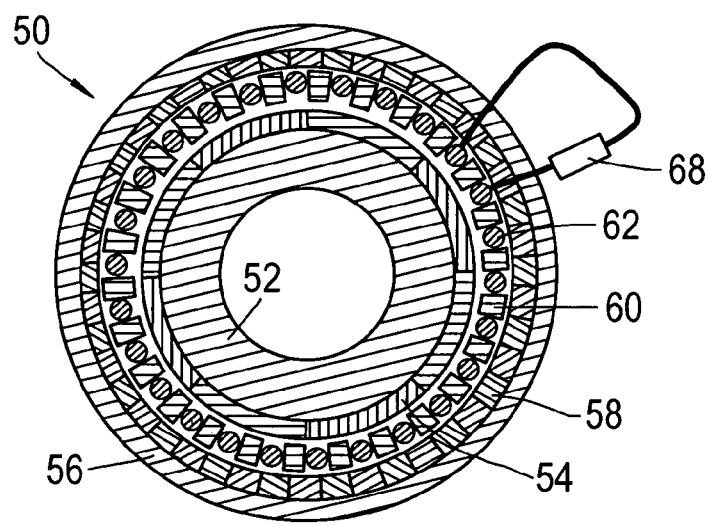
FIG. 4 shows a schematic plan view of a gearbox according to an embodiment of the second aspect of the invention.

The concept of using temperature to regulate the mode of operation of a magnetic gearbox may also be applied to gearboxes in which all the magnetisable portions of the coupling element have the same Curie temperature. FIG. 4 shows a gearbox 50 having inner and outer rotors 52,56 having permanent magnets 54,58 respectively. Pole elements 60 are provided between the inner and outer rotors 52,56. In the embodiment shown in FIG. 4, each active pole element 60 forms one interpole. The pole elements 60 are all made from the same material, that is, they have the same Curie temperature. At temperatures above the Curie temperature of the pole elements, all pole elements are inactive, so no interpoles are available to transfer power between the inner and outer rotors 52, 56.

A temperature controller 68 is also provided having heating and/or cooling elements. The temperature controller effectively provides a switch to change the mode of operation of the gearbox e.g. from a fully operational mode, below the Curie temperature of the pole elements to a high temperature mode in which no power is transferred between the inner and outer rotor.

Wiring 62 is wound around the pole elements 60 and the electrical current induced in the wiring 62 by the changing magnetic field of the gearbox is used to power the temperature controller 68.

In this case, the wiring may be connected to one or more electronic filters which draw out components of the magnetic field having a predetermined frequency or range of frequencies for use in powering the temperature controller.

Preferably, the electronic filter(s) are configured to draw out components of the magnetic field (using them to generate current in a coil) that would otherwise tend to reduce the efficiency of the coupling of the first and second gear members. These components of the magnetic field may then be used in powering the temperature controller.

Figure 5:
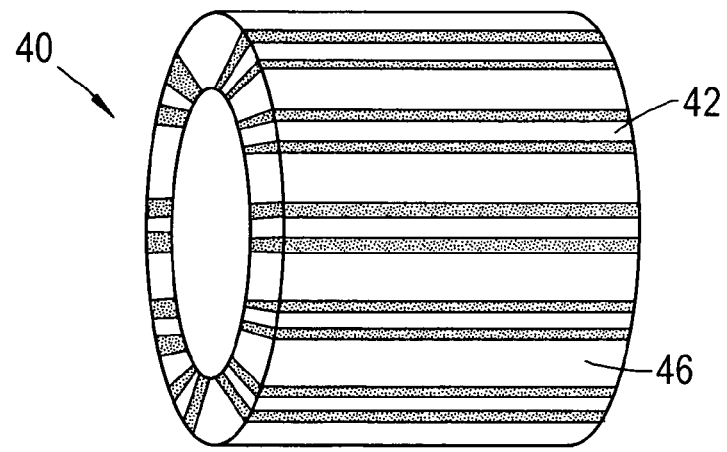
FIG. 5 shows a schematic perspective view of a coupling element for a gear arrangement according to an embodiment of either the first or second aspects of the invention.

FIG. 5 shows a schematic perspective view of a coupling element of a gearbox according to another embodiment of the invention. In the coupling element 40, the pole elements 42 are bonded by means of a bonding element 46, such that the pole elements 42 and the bonding element layers 46 together provide an integral cylindrical body. The bonding element 46 is formed from a non-magnetisable material, i.e. it is magnetically inactive and does not modulate the magnetic fields generated by the inner and outer rotors.

Again a temperature controller (not shown) controls the temperature of the pole elements, and hence the arrangement of interpoles formed by the pole elements. The bonding element 46 preferably comprises a material having high thermal conductivity, such as a metal, in order to allow the pole elements 42 to be heated or cooled rapidly and uniformly.

The bonding element 46 may be electrically conductive. Typically, the bonding element 46 is laminated in order to reduce the formation of eddy currents to a predetermined level.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

The invention claimed is:

1. A magnetic gear arrangement comprising:
a first gear member for generating a first magnetic field,
a second gear member for generating a second magnetic field, and
a coupling device that provides arrangements of interpoles between the first gear member and the second gear member, the interpoles coupling the first and second magnetic fields such that different arrangements of the interpoles produce different gear ratios between the first and second gear members;
wherein:
the coupling device comprises a plurality of ferromagnetic pole elements that at least partly form the interpoles, each of the plurality of ferromagnetic pole elements having a Curie temperature such that each of the plurality of ferromagnetic pole elements is active below its Curie temperature and inactive above its Curie temperature, and
the magnetic gear arrangement further comprises a temperature controller for controlling a temperature of at least some of the plurality of ferromagnetic pole elements such that, under the control of the temperature controller, the temperatures of the plurality of ferromagnetic pole elements can cross their respective Curie temperatures and thereby change from active to inactive or the reverse.

2. The magnetic gear arrangement according to claim 1, wherein a different arrangement of the interpoles can be provided by the coupling device when the plurality of ferromagnetic pole elements cross their respective Curie temperatures.

3. The magnetic gear arrangement according to claim 1, wherein a portion of the plurality of ferromagnetic pole elements has a first Curie temperature, and another portion of the plurality of ferromagnetic pole elements has a higher second Curie temperature.

4. The magnetic gear arrangement according to claim 1, wherein the temperature controller and the coupling device are configured such that the temperature controller varies the temperatures of all the plurality of ferromagnetic pole elements of the coupling device, and all of the plurality of ferromagnetic pole elements can be maintained at substantially the same temperature.

5. The magnetic gear arrangement according to claim 1, wherein the temperature controller and the coupling device are configured such that the temperature controller varies the temperatures of only a selected portion of the plurality of ferromagentic pole elements of the coupling device, and a temperature differential can be maintained between the plurality of ferromagentic pole elements of the coupling device.

6. The magnetic gear arrangement according to claim 1, wherein an action of the temperature controller is itself determined by an operating condition of at least one of the first and second gear members.

7. The magnetic gear arrangement according to claim 6, further comprising a sensor for detecting the operating condition of at least one of the first and second gear members and communicating the operating condition to the temperature controller.

8. The magnetic gear arrangement according to claim 1, wherein the temperature controller comprises a heater which heats the plurality of ferromagnetic pole elements.

9. The magnetic gear arrangement according to claim 8, wherein the temperature controller comprises wiring that heats selected individual pole elements, a heating current being generated in the wiring through movement of the first and second gear members relative to the wiring.

10. The magnetic gear arrangement according to claim 9, wherein the wiring is electrically connected to one or more electronic filters, the one or more electronic filters selecting the heating current and suppressing current components that would otherwise be generated in the wiring through the movement of the first and second gear members relative to the wiring.

11. The magnetic gear arrangement according to claim 1, wherein the first gear member has permanent magnets for generating the first magnetic field and the second gear member has permanent magnets for generating the second magnetic field.

12. The magnetic gear arrangement according to claim 1, wherein neighbouring pole elements are joined together by non-magnetisable portions of the coupling device.

13. The magnetic gear arrangement according to claim 12, wherein the non-magnetisable portions are formed of an electrically-conductive material.

14. A method of operating a magnetic gear arrangement, the method comprising:
(a) providing a magnetic gear arrangement having:
a first gear member for generating a first magnetic field,
a second gear member for generating a second magnetic field, and
a coupling device that provides arrangements of interpoles between the first gear member and the second gear member, the interpoles coupling the first and second magnetic fields such that different arrangements of the interpoles produce different gear ratios between the first and second gear members;

wherein:

the coupling device comprises a plurality of ferromagnetic pole elements that at leastly partly form the interpoles, each of the plurality of ferromagnetic pole elements having a Curie temperature such that each of the plurality of ferromagnetic pole elements is active below its Curie temperature and inactive above its Curie temperature; and (b) controlling a temperature of at least some of the plurality of ferromagnetic pole elements such that the temperatures of the plurality of ferromagnetic pole elements cross their respective Curie temperatures, and thereby change from active to inactive or the reverse.

15. The magnetic according to claim 14, wherein a different arrangement of the interpoles is provided by the coupling device when the plurality of ferromagnetic pole elements cross their respective Curie temperatures.

\* \* \* \* \*